No. 649,053. Patented May 8, 1900.
W. F. HENDERSON.
PNEUMATIC TIRE FOR BICYCLES.
(Application filed May 31, 1899.)
(No Model.)
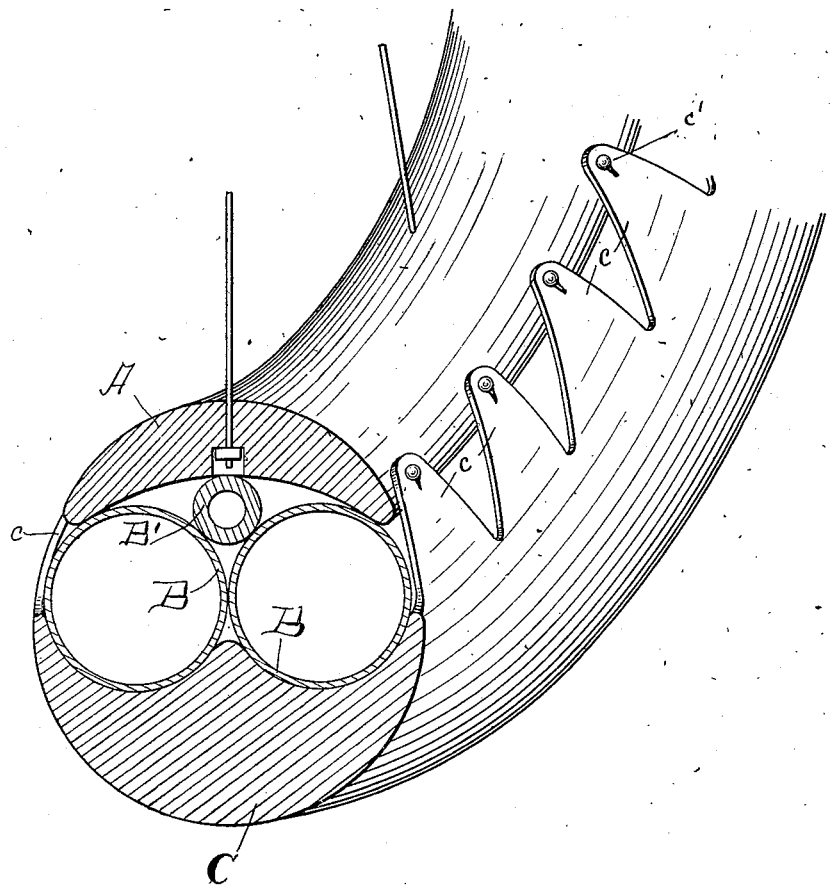
Witnesses:
Inventor:
William F. Henderson

United States Patent Office.

WILLIAM F. HENDERSON, OF CHICAGO, ILLINOIS, ASSIGNOR TO WILLIAM D. COOPER AND WILLIS J. GROW, OF SAME PLACE.

PNEUMATIC TIRE FOR BICYCLES.

SPECIFICATION forming part of Letters Patent No. 649,053, dated May 8, 1900.

Application filed May 31, 1899. Serial No. 718,803. (No model.)

*To all whom it may concern:*

Be it known that I, WILLIAM F. HENDERSON, a citizen of the United States, residing in the city of Chicago, county of Cook, and State of Illinois, have invented a new and useful Improvement in Pneumatic Tires for Bicycles and other Wheeled Vehicles, of which the following is a full, clear, and exact description, such as will enable others skilled in the art to which it appertains to make and use the same.

My invention relates to improvements in pneumatic tires, and more particularly to that class termed "punctureless," the prime object of the same being to provide a pneumatic tire for bicycles, automobiles, and other wheeled vehicles in which the air-tubes shall not be susceptible to wear or injury in ordinary use, that shall be cheap to manufacture, readily applied, inexpensive in operation, and that will afford the greatest possible amount of service and resiliency.

My invention consists of a pneumatic tire composed of two air or pneumatic tubes of suitable material, preferably rubber and fabric, of equal size, weight, and circumference, each provided with means for inflation and adapted to encircle the periphery of the rim or felly of a wheel diametrically parallel thereon or therein; of a flexible band which may be fixed or detachable, made of any suitable material, preferably rubber and fabric, having an oval or coniform periphery, and adapted to encircle and fully cover the peripheries of the said air-tubes to constitute the tread of the tire and to protect the said air-tubes from puncture or injury, and of a third minor uninflated rubber tube or band of suitable size centrally disposed around the rim or felly between and approximate to the said air-tubes.

My invention also consists in other details of construction, application, and combination of parts, which are hereinafter more fully described.

Referring to the accompanying drawing, forming a part of this specification, the figure represents a cross-sectional view of my improved tire, with the third minor tube interposed, applied to a bicycle-wheel having the ordinary rim or felly, such as are in general use. The figure also represents a plain side view of the same, showing means that may be employed in attaching the tire to the rim or felly of the wheel, but are not claimed as essential either in the construction or the successful operation of my tire. Therefore I do not confine myself to the exact construction shown.

Like letters of reference indicate like parts throughout the drawing.

A indicates the rim or felly of a wheel of the ordinary form in general use; but any form of rim affording a suitable and secure seat or bearing for the tire may be employed, preferably those having a double or triple concaved or tubularly-grooved periphery adapted to perfectly fit the tubes constituting the inner surface or base of the tire. Hence it will be observed that the application of my tire is not confined to any special form of rims.

B B indicate the two air or pneumatic tubes, of suitable material, of equal size, weight, and circumference, each provided with suitable means of inflation and adapted to encircle the periphery of the rim or felly of a wheel in the manner shown to afford a means of resiliency. B' indicates the third and minor uninflated rubber tube or band of suitable size centrally disposed around the said rim or felly between and approximate to the said tubes B B to afford a central bearing and increase the solidity of the tire.

C indicates the flexible band or ring, having an oval or coniform periphery and a double concaved or tubularly-grooved inner surface adapted to encircle and fully cover the peripheries of the said air-tubes B B to constitute the tread of the tire. In the side view of the drawing, c indicates lugs or extensions of the outer edges of the tread-band C, and C' buttons or other means of attaching same to the rim or felly of a wheel. These are shown only as a means that may be employed to further protect the said air-tubes B B over which they pass from injury and more securely retain the tire in position, but are not claimed as a part of or essential to my invention or the successful operation of my improved tire and may be used or not used without interfering with or departing from the scope of my invention, the essential features of which are the combination of the two air-tubes B B, the tread-band C, and the third minor tube or band B', interposed, applied circumferentially to the rim or felly A of a bicycle or other wheel, and secured in position thereon or therein by the application of a suitable adhesive substance and the inflation of the said air-tubes exclusive of any other means of fastening.

The minor tube or band B' is not claimed as an essential part of the tire or necessary to its application or successful operation, but as a means of regulating the resiliency of the tire, which is effected by the use and non-use of the said tube B', as is clearly observed.

It will be further observed that in the construction of my improved tire it is adapted to be applied to the ordinary rim or felly in use or any special form desired and that it is rendered punctureless by the air-tubes being entirely protected by the tread-band C.

In the application of my tire the air-tubes B B are deflated and, together with the tread-band C, are placed in position on the rim A, to which has first been applied a supply of adhesive substance. The air-tubes B B are then fully inflated, thus securing them, together with the tread-band C, to the rim or felly of the wheel.

The minor tube or band B' when employed is first centrally disposed around the rim or felly of the wheel in the position shown.

It will be yet further observed that in consequence of the air-tubes B B being entirely protected from injury and only affording the means of resiliency they may be of much lighter construction than the ordinary tire, thus equalizing the expense and weight of my tire with that of the ordinary tires in use.

Having thus fully described my invention, what I claim as new and improved, and desire to secure by Letters Patent, is—

In a pneumatic tire for bicycles and other wheeled vehicles, the combination, with two circular air or pneumatic tubes of equal size, weight and circumference, made of any suitable material, and adapted to encircle the periphery of the rim or felly of a wheel diametrically parallel thereon or therein; means for the introduction and retention of air under equal pressure in said tubes; a detachable or fixed flexible band or ring, composed of rubber and fabric, having an oval or coniform periphery, and a double concaved or tubularly-grooved inner surface, and adapted to encircle and fully cover the peripheries of the said air-tubes and bind tightly thereon when fully inflated, constituting the tread of the tire; a third minor uninflated rubber tube or band of suitable size and circumference centrally disposed around said rim or felly between and approximate to the said air-tubes; the whole adapted to be applied circumferentially upon or within the rim or felly of a wheel separately or together, and secured in position exclusively by the full inflation of the said air-tubes and the application to the said rim of any suitable adhesive substance, substantially as described and for the purpose set forth.

In witness whereof I have signed this specification, in the presence of two subscribing witnesses, this 29th day of May, 1899.

W. F. HENDERSON. [L. S.]

Witnesses:
 J. R. BELL,
 J. HOOPES.